United States Patent [19]

Pieper

[11] Patent Number: 4,797,092
[45] Date of Patent: Jan. 10, 1989

[54] CULLET PREHEATER

[75] Inventor: Helmut Pieper, Lohr/Main, Fed. Rep. of Germany

[73] Assignee: Nikolaus Sorg GmbH & Co. Kg, Lohr/Main, Fed. Rep. of Germany

[21] Appl. No.: 79,171

[22] Filed: Jul. 29, 1987

[30] Foreign Application Priority Data

Aug. 6, 1986 [DE] Fed. Rep. of Germany ....... 3626076

[51] Int. Cl.⁴ .............................................. F27B 15/00
[52] U.S. Cl. ........................................ 432/95; 432/96; 432/97; 432/99
[58] Field of Search ..................................... 432/95–99

[56] References Cited

U.S. PATENT DOCUMENTS

| 2,597,585 | 5/1952 | Howard | 432/99 |
| 2,996,292 | 8/1961 | Graf et al. | 432/99 |
| 3,544,096 | 12/1970 | Buchner | 432/99 |
| 4,007,014 | 2/1977 | Mastumoto | 432/95 |
| 4,149,844 | 4/1979 | Noyes | 432/97 |
| 4,249,891 | 2/1981 | Noyes et al. | 432/99 |
| 4,254,221 | 3/1981 | Beckenbach | 432/95 |
| 4,473,352 | 9/1984 | Sunoda et al. | 432/96 |
| 4,668,184 | 5/1987 | Dorman | 432/96 |

Primary Examiner—Henry C. Yuen
Attorney, Agent, or Firm—Felfe & Lynch

[57] ABSTRACT

A preheater for cullet is disclosed, in which hot gas coming from a hot supply duct can be passed through the cullet while yielding heat to the latter and can be carried away through a hot gas exhaust duct. The cullet is guided between guiding walls forming a cullet shaft and permitting gas entry as well as gas exit. Means are provided for repeatedly moving at least one of the guiding walls (23, 24,25,26) laterally relative to another guiding wall (23–26) so as to change the spacing between them.

8 Claims, 3 Drawing Sheets

⇨ Cullet
⇨ Hot Gas

CULLET PREHEATER

BACKGROUND OF THE INVENTION

The invention relates to a cullet preheater having a heating section in which hot gas coming from a hot gas supply duct can be passed through the cullet, yielding heat to the latter, and can be carried away by a hot gas exhaust duct. Within the preheater the cullet is guided between walls which form a cullet shaft and permit the entry and exit of gas.

Preheating crushed glass as a recyclable raw material (known as "cullet") to aid in the melting of glass by means of hot gas—generally exhaust from glass melting furnaces—is a method which has long been known for the achievement of an optimum energy balance and, as an additional effect, for the achievement of a certain filtering of the exhaust gas in glass production, and it is described for example in the German Pat. No. 21 61 419. This patent also describes an apparatus for preheating cullet by means of exhaust gas from glass melting furnaces. The disclosed apparatus consists essentially of an upright cylinder which is filled with cullet and in which hot gas is introduced through pipe connections in the bottom area and withdrawn at an area further above it. Centrally in the cylinder there is a perforated pipe which serves to guide the flow of the hot gas.

In addition to this apparatus a preheater is known in which cullet is guided in a vertical shaft between two gas-permeable guiding walls. Here hot gas enters the cullet through the one guiding wall, flows transversely through the cullet and exits through the second gas-permeable guiding wall.

It is a disadvantage of both the known preheaters that the condensation of components of the hot gas, mostly sodium bisulfate, causes the individual glass shards to stick or cake up in the cullet preheater, impairing or even totally destroying the free-flowing quality of the cullet. As a result, the heated cullet can be removed from the preheater only with difficulty.

Another disadvantage of the known preheaters is that they can be operated only by one established method, and thus cannot be adapted to varying properties of the cullet that is to be preheated.

The problem therefore arises of heating a preheater of the kind described above, in which the described disadvantages will be avoided and in which a trouble-free flow of the cullet will be assured, along with ease of removal from the preheater.

In further development of the invention, the preheater is to be flexibly adaptable to varying requirements.

SUMMARY OF THE INVENTION

The solution of this problem is achieved, according to the present invention, by providing a preheater of the kind described, in which at least one of the guiding walls is movable relative to the other guiding wall or walls in such a way as to vary the space or distance between them.

The movement of at least one of the guiding walls of the cullet shaft enables the cullet in the latter to be loosened and kept free-flowing or restored to free flow, in a simple manner. Since the actuation of the movable guiding wall can be accomplished from without, no moving parts are necessary inside of the cullet shaft. Great wear due to the presence of broken glass and aggressive flue gases is thus avoided.

A preferred embodiment of the invention provides for the preheater to have two cullet shafts disposed substantially parallel to one another and defined each by two approximately parallel guiding walls, for the two outer guiding walls to be disposed fixedly, and for the two inner guiding walls to be spaced apart from one another to form a hot-gas gap, and connected together to form a movable central body. In this manner a high throughput can be achieved with a minimum of structural complexity and the hot gas can at the same time be made to flow uniformly through the cullet.

Preferably the central body is suspended pivotally by its upper end and can be made to perform a swinging or shaking movement continuously or periodically by means of a crank drive or unbalanced vibrator. This embodiment results in an uncomplicated construction and drive of the movable central body.

Furthermore, externally the two outer guiding walls are associated one with a hot gas intake manifold and the other with an exhaust manifold, these manifolds as well as the hot-gas gap between the two inner guiding walls being connectable individually or in groups with the hot gas intake and exhaust ducts, respectively. This makes it possible to operate the preheater in different modes. For example, depending on specific parameters, such as hot gas temperature, the desired cullet temperature, the allowable pressure drop or the maximum allowable velocity of flow between the glass fragments, the hot gas can be guided through only one of the shafts at a time in parallel operation, or successively through both shafts in series operation.

Additional possibilities for the adaptation of the preheater to different parameters of the above-named kind result from the fact that the two outer guiding walls are each divided into upper and lower portions, and that a separate hot gas intake manifold or exhaust manifold is associated respectively with each of the portions, and can be connected selectively to the hot gas supply duct or to the hot gas exhaust duct. For example, the hot gas can thus be guided first from the outside transversely through the lower part of the shafts, then rise in the interior of the central body shut off from the hot gas supply and exhaust ducts, and from there it can flow in the opposite direction transversely through the upper part of the shafts. In another mode of operation the hot gas can be fed simultaneously to both portions of the outer guiding walls, and then flow from the outside inwardly into the central body and from there to the hot gas exhaust duct. On account of its different possible modes of operation, the optimum manner of the operation of the preheater according to the invention can be selected.

In further development of the invention, this selection can be made, for example, by an automatic control using appropriate valves and/or dampers.

Suitable guiding walls are especially those provided with slats disposed in the manner of a jalousie. The individual slats are logically so arranged that they slant toward the interior of the shaft and thus serve to guide the cullet. At the same time they permit the hot gas to enter or leave through the spaces between them.

To prevent cool air from entering the preheater through the incoming cullet, a hopper section containing a supply of cullet serving as a gas seal is provided above the heating section. The supply of cullet in this hopper puts up a substantially greater resistance to the flow of air in comparison to the cullet present in the shaft itself, so that outside air can enter the preheater only in negligible amounts.

In case the pressure drop of the gas flowing through the preheater should be too great, an exhaust blower can be disposed in the hot gas exhaust duct. This blower can simultaneously provide a depression in the preheater below the atmospheric air pressure, thereby resulting in an effective draft of gas from a melting furnace.

To operate the preheater at reduced power and shut it down entirely, it is desirable to connect to hot gas supply duct and the hot gas exhaust duct directly to one another through at least one connecting duct that can be shut off.

The dimensioning of the preheater, especially of the flow cross sections in the guiding walls and shafts, is made such that the velocity of the gas in the shafts, is made such that the velocity of the gas in the shafts as it passes through the cullet will be so low that particles of cullet will not be entrained by it. Preferably, the gas velocity is adjusted so that at least a portion of the dust particles will settle out of the hot gas within the cullet due to loss of velocity, and will thus be fed back into the melting furnace. An additional filtering effect is achieved by the fact that dust particles will attach themselves to the cullet by forces of adhesion and gaseous components will become attached by condensation as the gas cools. On the basis of the different modes of operation of the preheater, the possibility exists, in the case of an excessive increase in the resistance to flow due to an increasing content of fine particles and condensate, of changing the preheater over during operation to a mode involving less basic resistance to flow.

For a full understanding of the present invention, reference should now be made to the following detailed description of the preferred embodiment of the invention and to the accompanying drawings.

DETAILED DESCRIPTION OF PREFERRED EMBODIMENT

Figure 1:
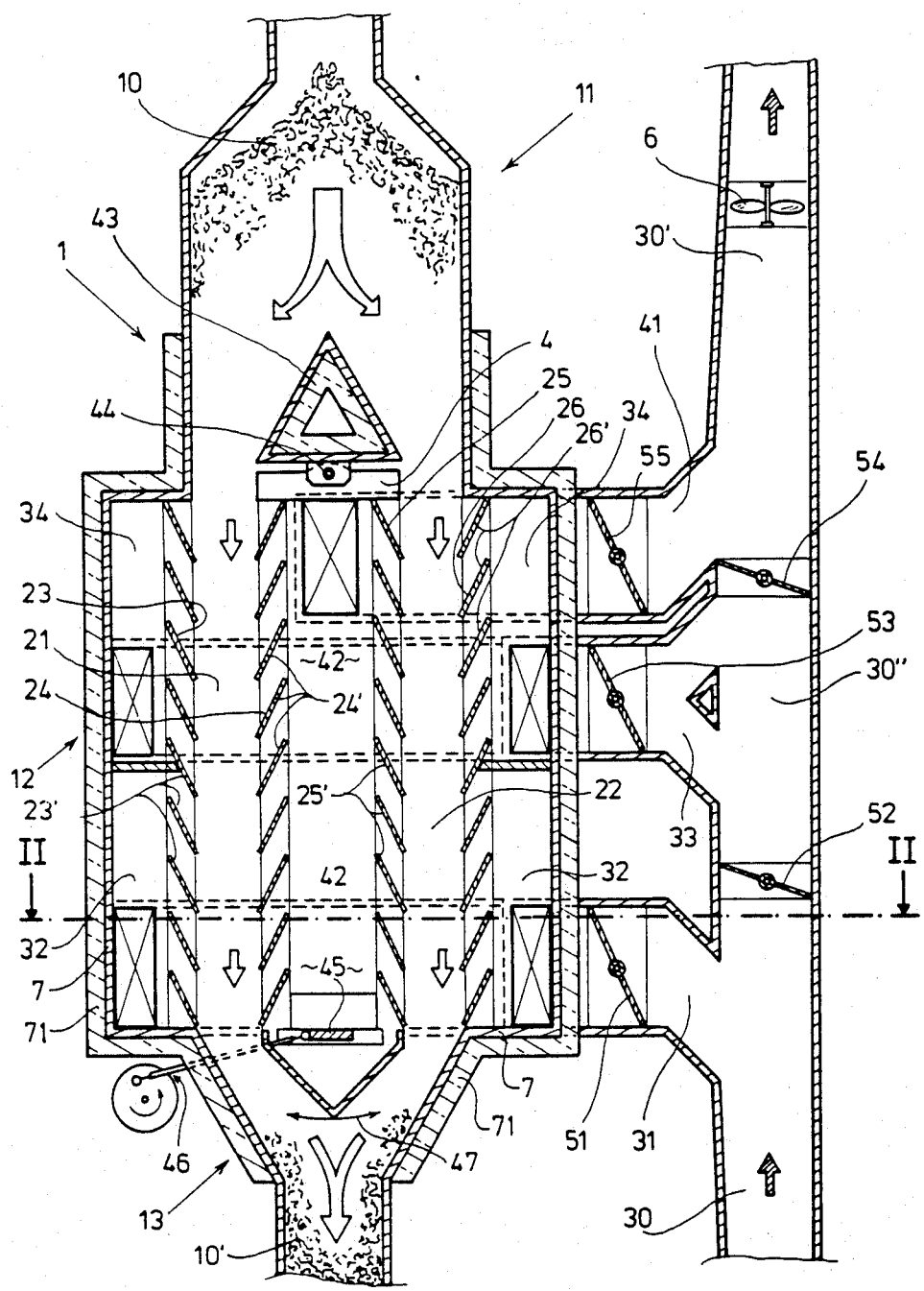
FIG. 1 is a vertical section through a cullet preheater according to the invention.

As seen in FIG. 1 of the drawings, the represented embodiment of the preheater 1 according to the invention consists substantially of a heating part 12 surmounted by a hopper section 11, which at the bottom adjoins a funnel 13. The above-named parts of the preheater 1 are surrounded by a wall 7 which is provided with thermal insulation 71 in the area of the heating section 12 and partially also in the area of the hopper section 11 and funnel section 13.

The hopper part 11 of the preheater 1 contains a supply of cullet 10 which, as indicated by the arrows, moves bit by bit through two parallel cullet shafts 21 and 22 toward the funnel 13. There the preheated cullet 10' is available for charging into a glass melting furnace.

The thermal energy for heating the cullet is taken from a hot gas stream which comes through a hot gas supply duct 30. The hot gas can be fed on different routes through the cullet shafts 21 and 22 via branches 31, 33 and 41 as well as dampers 51, 52, 53, 54 and 55, and finally can be fed to a hot gas exhaust duct 30'.

The cullet shafts 21 and 22 are each defined by slatted walls 23 and 24, and 25 and 26, respectively. The slats 23', 24', 25' and 26' of the slatted walls 23-26 provide for keeping the cullet within the shafts 21 and 22 and at the same time permit passage of the hot gas into the cullet and out of it. For the distribution and collection of the hot gas, hot gas intake and exhaust manifolds 32, 34 and 42' are disposed on the sides of the slatted walls facing away from the shafts. In the illustrated embodiment of the preheater 1 the two outside slatted walls 23 and 26 are divided each into an upper section and a lower section, each of which is associated with each of the two lower sections and they are connected in common through the branch 31 and the damper 51 to the hot gas supply duct 30. With each of the upper sections there is associated one of the two manifolds 34 which can be connected selectively through the branch 33 and the dampers 52, 53 and 54 to the hot gas supply duct 30 or the hot gas exhaust duct 30'. The hot gas chamber 42 that is present between the two inner slatted walls 24 and 25 is in this embodiment connected to the hot gas exhaust duct 30' through the branch 41 and the damper 55.

The two inner slatted walls 24 and 25 with their slats 24' and 25' as well as the hot gas chamber 42 between them are combined into a central body 4. The latter is pivotally suspended at its upper end 44 from a stream divider 43 running transversely through the hopper section 11 and dividing the stream of cullet coming from the hopper section. At its bottom end the central body 4 has at least one actuating lever 45 brought out from the preheater 1, and this lever is engaged by an excentric drive 46. By means of this excentric drive 46 the central body 4 can be set into a swinging or shaking movement, as indicated by the arrow 47, for the purpose of making the cullet flow or keeping it flowing freely in the shafts 21 and 22. Instead of the excentric drive as in this example, the movement of the central body 4 can also be produced differently, such as, for example, by an electromagnetic means or by a piston and cylinder arrangement.

An exhaust fan 6 can be disposed in the hot gas exhaust duct 30' to assist the flow of hot gas through the preheater 1.

Figure 2:
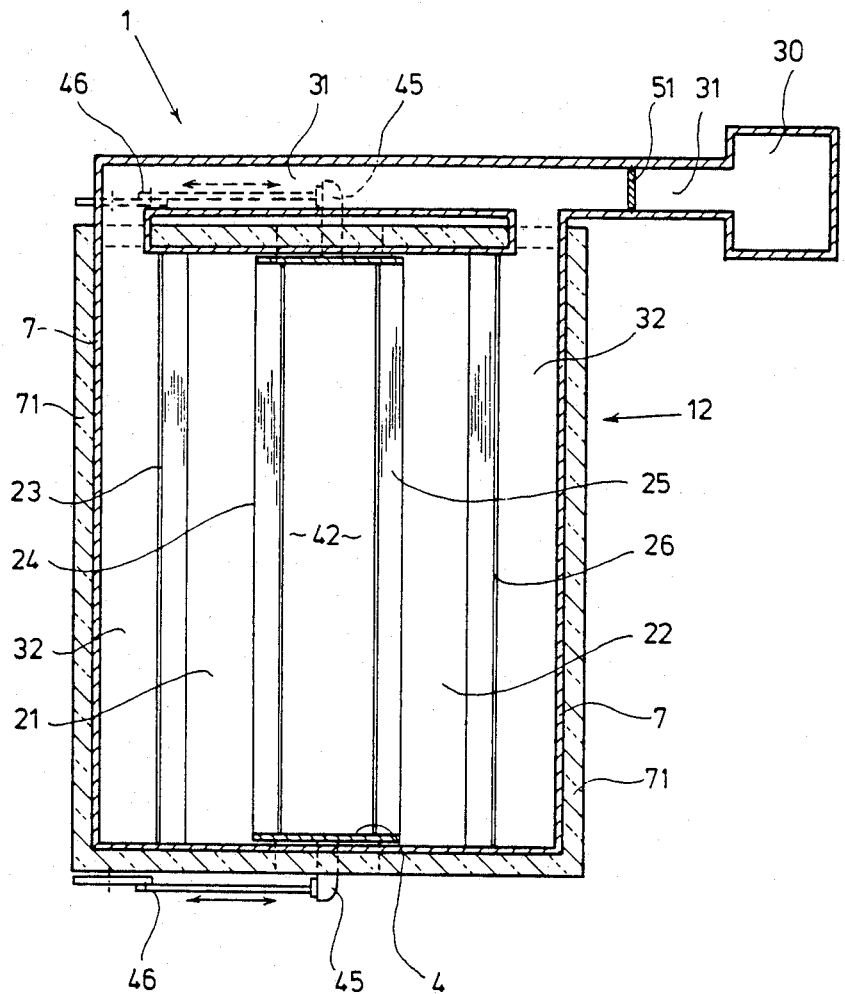
FIG. 2 is a cross section taken along line II—II through the preheater of FIG. 1.

FIG. 2 shows a section through the apparatus of FIG. 1, taken along lines II—II therein. In this figure again the wall 7 provided with the thermal insulation 71 can be seen surrounding the preheater 1. Inside of the preheater 1, or more precisely inside of its heating section 12, can be seen the four slatted walls 23, 24, 25 and 26 which are disposed parallel to one another. Between the two outer slated walls 23 and 26 and wall 7 the two hot gas manifold chambers 32 can also be seen. These are connected in common to the hot gas supply duct 30 through the branch duct 31 which can be closed by means of the damper 51.

Between the pairs of slatted walls 23 and 24, and 25 and 26, are the cullet shafts 21 and 22, respectively. Their cross section is preferably in the shape of an elongated rectangle, the hot gas entering and leaving at the long sides of the rectangle. Thus, if the height of the cullet shafts 21 and 22 is great, there will be a great cross section for the hot gas to traverse on its way through the cullet, thus providing for an advantageously small pressure loss and for desirably low velocities of flow of the hot gas within the cullet.

Lastly, the hot gas chamber 42 can be seen between the two inner slatted walls 24 and 25. In this figure it can also be seen that the two inner slatted walls 24 and 25 are combined by attaching their ends together, to form the central body 4. Also, this figure shows the actuating levers 45 extending outwardly from the central body 4, which can be given a reciprocating movement in this example by two excentric drivers 26.

Figure 4:
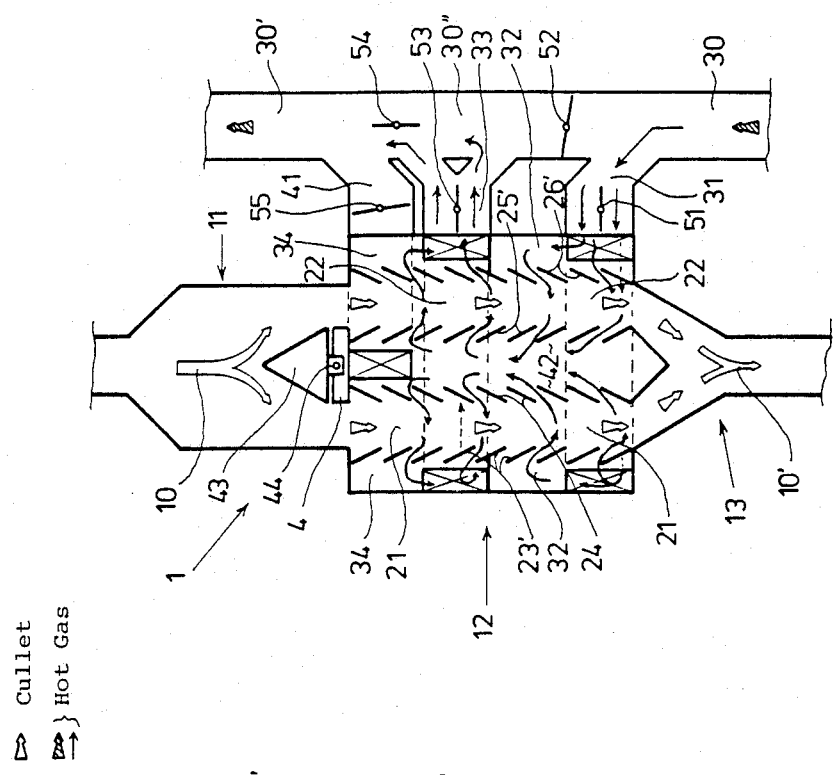
Figure 3:
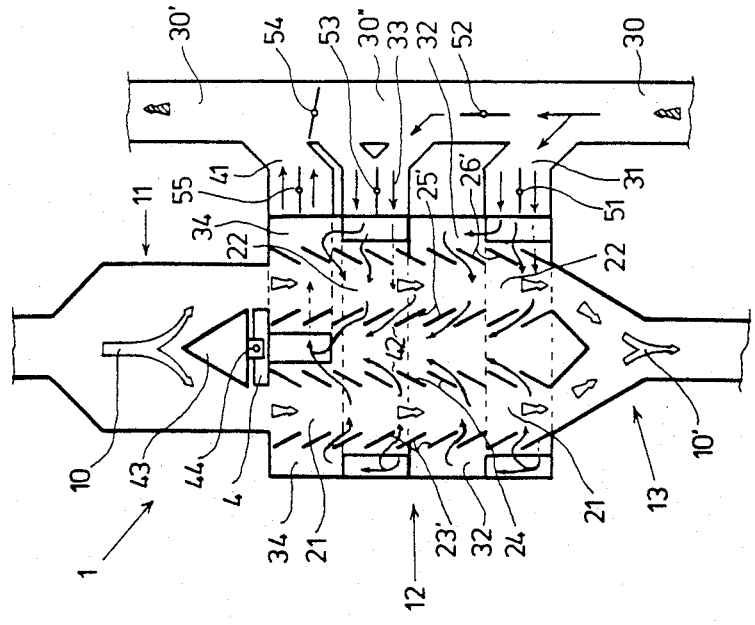
FIG. 3 is a simplified diagrammatic vertical section through the preheater of FIG. 1, in a first mode of operation; and, FIG. 4 shows, in the same manner as in FIG. 3, the preheater in a second mode of operation.

By being equipped with a plurality of branch ducts 31, 33 and 41 and a plurality of dampers 51 and 55 in the said branch lines as well as in the hot gas supply and exhaust ducts 30 and 30', respectively, the preheater 1 according to the invention can be operated in different modes. Two preferred modes of operation are represented in FIGS. 3 and 4. The preheater 1 is for this purpose shown in a simplified representation, in which the reference numbers correspond to those in FIGS. 1 and 2.

FIG. 3 shows the preheater 1 in so-called "parallel operation." In this mode hot gas comes from the hot gas supply duct 30 and through the branch duct 31 with its open damper 51, as well as through branch duct 33 with its open damper 53, into the manifolds 32 and 34. Thus, all manifolds 32 and 34 operate as hot gas distributing manifolds. Any direct flow of hot gas from the hot gas supply duct 30 into the hot gas exhaust duct 30' is prevented by the damper 54 which is disposed between the exists of the branch ducts 33 and 41, and which in this case is closed. To allow hot gas to pass from the hot gas supply line 30 to the branch duct 33, the damper 52 disposed between the exits of the branch ducts 33 and 31 is opened.

The hot gas fed in the above-described manner to the manifolds 32 and 34 passes from their through the spaces between the slats 23' and 26' into the cullet shafts 21 and 22. On account of the shape of the shafts 21 and 22, described above, the hot gas flows substantially transversely through the cullet in the shafts 21 and 22 and passes from there through the gaps between the inner slats 24' and 24' into the hot gas chamber 42 in the central body 4. Inside of the hot gas chamber 42 in the central body 4, the gas rises upwardly and finally flows through the branch duct 41, through the open damper 55 in this duct 41, into the hot gas exhaust duct 30'. From there the hot gas, after filtering or washing if desired, can be fed to a chimney or elsewhere.

In the mode of operation just described, since the hot gas passes only once through the cullet, the hot gas undergoes a comparatively slight loss of pressure on its way through the preheater 1. At the same time, however, the hot gas emerges from the preheater 1 with a still relatively high temperature.

In the mode of operation represented in FIG. 4, the so-called "series operation," the thermal energy of the hot gas is better utilized, but there is a slightly greater loss of pressure. This second mode of operation of the preheater 1 is brought about by now closing the dampers 52 and 55 and opening damper 54. This results in the flow of hot gas through the preheater 1 which is indicated by the flow arrows. Since damper 52 is now closed, hot gas passes only through the branch duct 31 through its open damper 51 into the bottom hot gas manifold chambers 32. From there the hot gas flows through the spaces between the slats 23' and 26' in the lower part of the heating section 12 into the cullet that is in the bottom part of the shafts 21 and 22. After the hot gas has flowed through the cullet substantially across the direction of its movement, the gas passes through the spaces between the slats 24' and 25' in the lower part of the central body 4 into the lower part of the hot gas chamber 42 in the central body 4. In this chamber 42 the hot gas rises, without, however, being able to escape through the branch duct 41 since the latter is shut off by its damper 55. Instead, the hot gas that has risen in the chamber 42 passes through the gaps between the slats 24' and 25' in the upper part of the central body 4 again through the glass cullet in the upper part of the shafts 21 and 22. After flowing through the cullet the gas passes through the spaces between the slats 23' and 26' in the upper part of the heating section 12 of the preheater 1 into the manifolds 34 which here accordingly serve as hot gas manifolds. From here the hot gas is carried at a reduced temperature through duct 33 and its still-open damper 53 and the low open damper 54 into the hot gas exhaust duct 30'.

In this mode of operation, therefore, the hot gas stream is passed twice through the cullet, resulting in better utilization of the heat accompanied by a slightly greater pressure loss.

The present invention creates a preheater which assures not only a trouble-free movement of the cullet, but also in further development of the invention, a flexible adaptation to various operating requirements.

There has been shown and described a novel cullet preheater which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

I claim:

1. In a preheater for cullet, in which hot gas coming from a hot gas supply duct can be passed through the cullet while yielding heat to the latter and can be carried away through a hot gas exhaust duct, and wherein the cullet is guided between guiding walls forming a cullet shaft and permitting has entry as well as gas exit, the improvement comprising: said cullet shaft has at least two cullet shafts each defined by two approximately parallel guiding walls, the two outer guiding walls being fixed and the two inner guiding walls being spaced from one another forming a hot-gas gap and are combined into a single movable central body, said central body being pivotingly suspended at its upper end; and moving means for repeatedly moving at least one of the guiding walls laterally relative to another guiding wall so as to change the spacing between them by continuously or periodically impart a switching or shaking movement to the central body, said moving means including an unbalanced or eccentric drive.

2. The preheater of claim 1, further comprising a hot gas intake manifold and an exhaust manifold associated with the two outer guiding walls, and the intake and exhaust manifolds and the hot-gas gap between the two inner guiding walls being selectively connectable, individually or in groups, with a hot gas supply duct or the hot gas exhaust duct.

3. The preheater of claim 2 wherein the two outer guiding walls are divided each into an upper and lower portion and wherein a separate hot gas intake manifold and exhaust manifold is respectively associated with each of the portions, the intake and exhaust manifold being each selectively connected to the hot gas supply duct and the hot gas exhaust duct, respectively.

4. The preheater of claim 2, further comprising an exhaust fan disposed in the hot gas exhaust duct.

5. The preheater of claim 2 wherein the hot gas supply line and the hot gas exhaust line are connected directly together by at least one connecting duct.

6. The preheater of claim 1 wherein the guiding walls contain slats disposed in the manner of a jalousie.

7. The preheater of claim 1, further comprising a hopper section disposed above the heating part with a supply of glass cullet forming a gas seal.

8. The preheater of claim 5 wherein the least one connecting duct is provided with shut off means.

* * * * *